United States Patent [19]

Borowski et al.

[11] 4,313,656
[45] Feb. 2, 1982

[54] WEIGHTING OF THE SCENE LIGHT SIGNAL DURING THE SHUTTER OPENING OPERATION

[75] Inventors: Kurt Borowski; Eduard Wagensonner, both of Aschheim, Fed. Rep. of Germany

[73] Assignee: Agfa-Gevaert AG, Leverkusen, Fed. Rep. of Germany

[21] Appl. No.: 154,301

[22] Filed: May 29, 1980

[30] Foreign Application Priority Data

Jun. 6, 1979 [DE] Fed. Rep. of Germany ....... 2922918

[51] Int. Cl.$^3$ ............................................ G03B 7/083
[52] U.S. Cl. ........................................ 354/29; 354/30; 354/50; 354/24
[58] Field of Search ........................ 354/29, 30, 38, 51, 354/50, 43, 258, 23, 24; 307/260, 270; 250/206, 215

[56] References Cited

U.S. PATENT DOCUMENTS

| | | | |
|---|---|---|---|
| 3,503,314 | 3/1970 | Tanabe | 354/24 |
| 3,889,276 | 6/1975 | Shirai | 354/38 |
| 4,006,484 | 2/1977 | Nobusawa | 354/50 |

FOREIGN PATENT DOCUMENTS 1522094 9/1970 Fed. Rep. of Germany .

Primary Examiner—Joseph W. Hartary
Assistant Examiner—S. D. Schreyer
Attorney, Agent, or Firm—Michael J. Striker

[57] ABSTRACT

A system is disclosed for automatically controlling the shutter in a camera in accordance with ambient scene light level. While the shutter is opening, incident light is weighted at only one-half the value at which it is weighted after the shutter has been fully opened. A switchable voltage divider is utilized to accomplish the weighting function in accordance with shutter blade position.

10 Claims, 2 Drawing Figures

WEIGHTING OF THE SCENE LIGHT SIGNAL DURING THE SHUTTER OPENING OPERATION

BACKGROUND OF THE INVENTION

This invention pertains to still cameras, and more particularly pertains to an electronic control system for operating the shutter mechanism of such cameras in dependence upon ambient scene light.

Conventionally, still cameras are equipped with one or more blades which can be interposed between the camera objective and the film plane. When such blade or blades are completely closed, no light is transmitted to the film and therefore no exposure occurs. However, when the shutter is depressed and the blades are mechanically displaced, a beam of light of increasing width is directed upon the film as the blades move. Thus, initially, only a small amount of light reaches the film at the beginning of shutter opening, but this amount increases rapidly as the blade opens, until finally the blade or blades are fully opened. At this latter time, intensity of light incident upon the film reaches a maximum value.

It may thus be seen that proper film exposure is dependent upon two stages of shutter opening: a first stage, in which the shutter increases the amount of light which is incident upon the film; and a second stage in which the shutter is fully open. During the first stage, both the effective f-stop of the optical system increases along with exposure time, while during the second stage only exposure time varies since the maximum f-stop of the system has already been reached and cannot be exceeded. Moreover, it will be appreciated by those skilled in the art that it is the cumulative amount of light impinging upon the film which determines proper exposure.

During the second stage of shutter operation, the total amount of incident light directed upon the film will increase directly with time. Thus, light intensity need only be measured in a conventional fashion while the shutter is in the second stage of operation. However, during the first stage of operation, the amount of light incident upon the film will change with time, since during the first stage of shutter operation the amount of light incident upon the film increases from zero to whatever maximum amount of light the camera objective will admit. Thus, in this stage of operation it is necessary to weight the significance of light admitted during shutter opening since the total amount of light incident upon the film will be the sum of the amount of light incident upon the film during the first stage of shutter operation and the amount of light incident upon the film during the second stage of shutter operation.

It has been found that when a weighting factor of one-half is used, an accurate exposure will result. Thus, it would be advantageous to provide a device which would automatically regulate shutter operation by weighting light incident upon the film at a value of one-half while the shutter is in its first stage of operation and then to weight light incident upon the film during the second stage of shutter operation at a value of unity.

SUMMARY OF THE INVENTION

This object, along with others which will appear hereinafter, is achieved by the use of a switchable voltage divider from which a weighting voltage can be derived. This voltage divider is connected to a switch, which switch is operated by the camera shutter. As will be seen hereinafter the voltage divider can be switched so as to cause a voltage which is derived from a silicon photodiode to be weighted appropriately during both stages of shutter operation.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENTS

Figure 2:
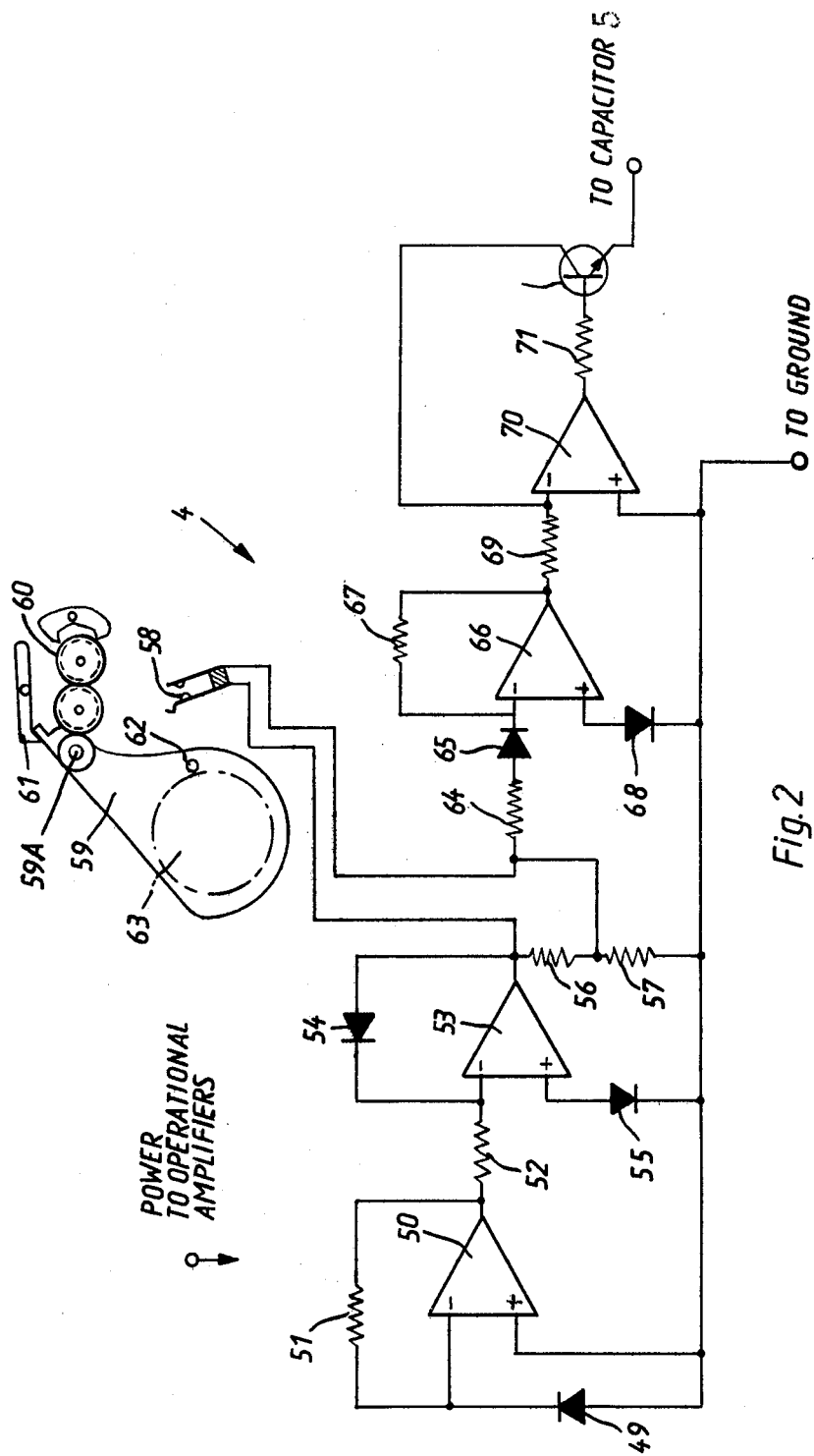
FIG. 2 shows a schematic diagram of a light-measuring circuit constructed according to the principles of this invention.

Referring first to FIG. 2, a shutter blade 59 is placed in front of a camera aperature 63 and is pivotally secured to an axle 59A. When the shutter is operated, blade 59 rotates counterclockwise about axle 59A until aperture 63 is completely uncovered. Those skilled in the art will readily apprehend that more than one blade 59 may exist in the shutter mechanism.

In order to open aperture 63 by movement of blade 59, trip latch 61 can be depressed by a user. Upon such depression, the escapement mechanism 60 (shown symbolically) will cause blade 59 to rotate counterclockwise about axle 59A under the influence of a spring (not shown) or any other suitable element. When blade 59 has rotated counterclockwise to a position in which aperture 63 is completely uncovered and the maximum f-stop of the camera objective (not shown) has been reached, pin 62 strikes the left contact of switch 58 in order to close switch 58. After a suitable time, which time is determined by the circuitry described herein, the shutter will be closed by energization of coil 23, which coil 23 is shown as part of the schematic diagram of FIG. 1. Upon energization of coil 23, blade 59 is rotated clockwise about axle 59A to completely recover aperture 63 and thus allow a subsequent exposure to take place.

In order to operate the circuitry described herein, it is necessary for depression of trip latch 61 to have electronic consequences so that the circuitry can be used to begin timing an exposure. As will be described hereinafter, single-pole single-throw switch 33 accomplishes this objective because it is connected to trip latch 61 and opens, at the latest, when blade 59 begins to rotate counterclockwise about axle 59A in order to begin an exposure.

Figure 1:
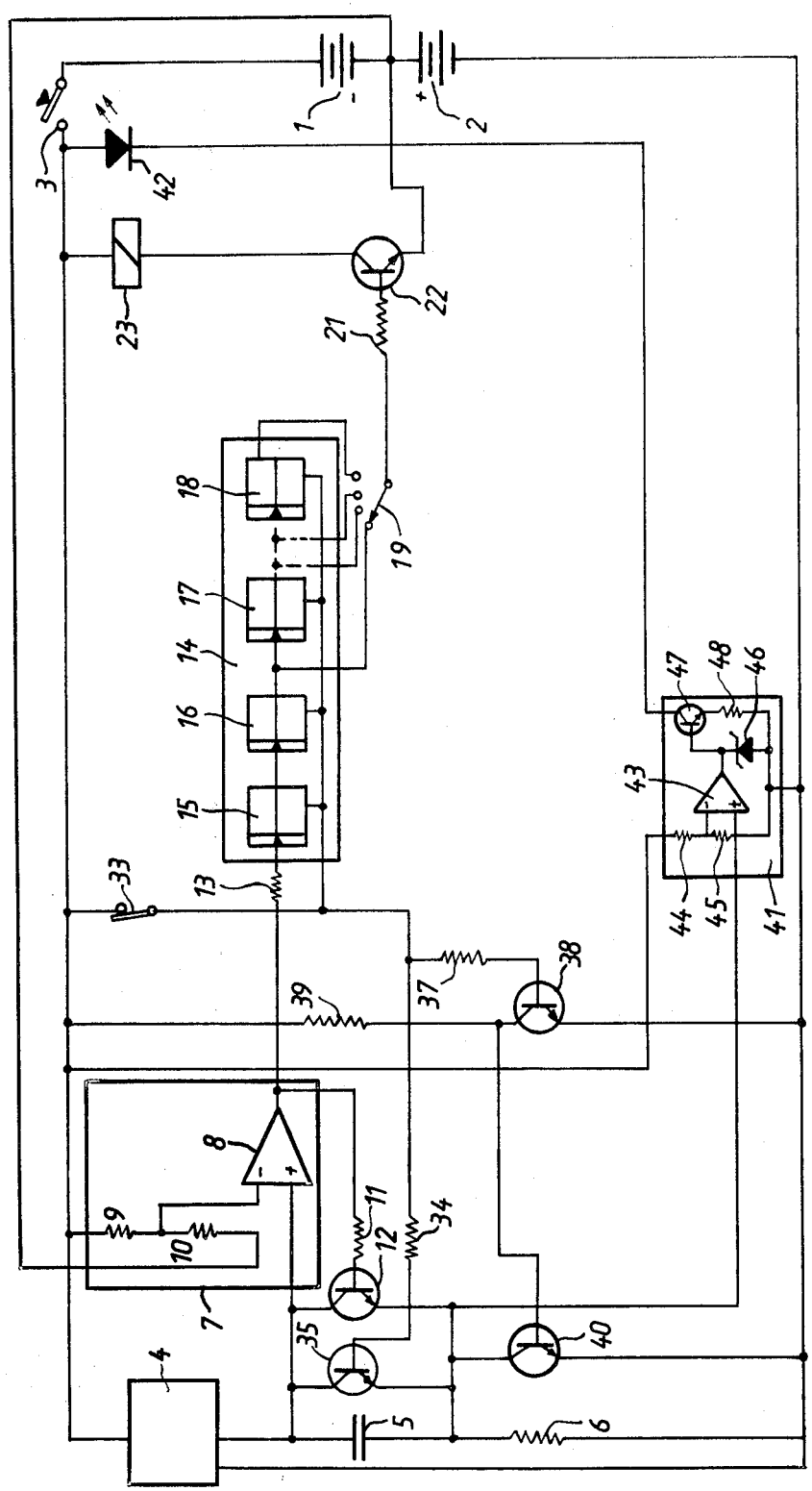
FIG. 1 shows a schematic diagram of that portion of the invention which is designed to close a camera shutter after the shutter has been triggered by a user.

Stage 4, shown in FIG. 1, is a variable-resistance element which has a resistance dependent upon ambient scene light intensity and position of blade 59. For the moment, it is only necessary to regard stage 4 as a variable-resistance element which is interposed between the hot side of cell 1 and capacitor 5. The purpose of stage 4 is to cause a charge to be built up across capacitor 5 in accordance with scene light intensity. That plate of capacitor 5 which is remote from stage 4 is connected to ground through resistor 6, so that a series network is formed between stage 4, capacitor 5 and resistor 6.

A voltage divider which includes resistors 9 and 10 connected in series with each other bridges across cell 1 through on-off switch 3, when switch 3 is closed. The inverting input of operational amplifier 8 is connected to the junction point of resistors 9 and 10. Thus, the inverting input of operational amplifier 8 is biased at a constant voltage. The output of operational amplifier 8 is connected to the base of transistor 12 through resistor 11. Additionally, the collector of transistor 12 and one plate of capacitor 5 are connected to the non-inverting input of operational amplifier 8, while the emitter of transistor 12 is connected to that plate of capacitor 5 which is connected to resistor 6.

It may thus be seen that operational amplifier 8 and resistors 9 and 10 form a threshold switch 7 that can be used to discharge capacitor 5 through transistor 12. Neglecting the effect of transistor 35, which effect will be described below, stage 4 will cause capacitor 5 to charge up as a function of ambient scene light level. After capacitor 5 has charged up sufficiently in excess of the voltage at the midpoint of the voltage divider which includes resistors 9 and 10, the output of operational amplifier 8 will have gone sufficiently positive that transistor 12 is turned on, causing capacitor 5 to discharge and causing he output of operational amplifier 8 to go negative as a result of the voltage impressed upon its inverting output. Upon such a transition, transistor 12 is turned off and capacitor 4 can charge up once again. Thus, a relaxation oscillator is formed, which relaxation oscillator generates an output signal at the output of operational amplifier 8 that has a frequency determined by the RC time constant of stage 4 and capacitor 5, which RC time constant will be a function of ambient scene light level.

The output of operational amplifier 8 is connected to peak counter 14 through limiting resistor 13. The function of peak counter 14 is to count the number of positive-going transitions at the output of operational amplifier 8. Since such number will be dependent upon ambient scene light level, peak counter 14 actually functions as a timer to time an exposure. When peak counter 14 has counted a desired number of positive-going transitions at the output of operational amplifier 8, transistor 22 will be rendered conductive by current flowing through resistor 21 and energizing coil 23, thus closing blade 59.

Inasmuch as it is desirable to be able to adjust peak counter 14 to reflect different types of film of differing film speed which may be utilized in a camera (not shown) in which this invention is installed, it is desirable to utilize a multiple-position selector switch 19 which is placed in series with the base of transistor 22 through resistor 21. Selector switch 19, which in this embodiment is shown to have four positions but may have any other number depending upon the number of types of film which are likely to be utilized, is connected to outputs of selected ones of internal stages within peak counter 14. The first three such stages are shown as 15, 16, and 17, with a series of like additional stages (not shown) being disposed between stages 17 and 18. Each one of these stages can be either a flipflop with a clocked input connected to the output of the preceeding stage or alternatively each stage may be a bit cell within a simple shift register. In either case, whether clocked flipflops (which serve as memories) or a shift register is used, the position of the rotating contacting arm of selector switch 19 will determine the number of positive pulses from the output of operational amplifier 8 which will be required to cause the base of transistor 22 to go sufficiently positive as to energize coil 23 through the collector-emitter circuit of transistor 22 to that point at which the cold side of cell 1 is connected to the hot side of cell 2. Hence, by rotating selector switch 19, the number of pulses required in order to energize coil 23 and close blade 59 can be varied in accordance with film speed.

It is obviously desirable to provide some indication of whether or not ambient scene light is sufficient in order to allow a proper exposure to be made. To this end, LED 42 is provided. LED 42 will light up prior to an exposure in the event that sufficient light is present so as to enable the exposure to take place. In orter to understand how LED 42 is energized, it is necessary to understand the operation of normally-closed start switch 33. Switch 33 is directly connected to three elements: the peak counter 14, transistor 35, and transistor 38. When switch 33 is closed, a reset line connecting all internal stages of peak counter 14 is brought positive, resetting peak counter 14 in preparation for a subsequent exposure. At the same time, a positive voltage is applied to the base of transistor 35 through resistor 34 and to the base of transistor 38 through resistor 37.

The collector-emitter circuit of transistor 35 is in parallel with the collector emitter circuit of transistor 12, and therefore transistor 35 can short across capacitor 5 in the same fashion as can transistor 12. When switch 33 is closed, transistor 35 will be rendered conductive, shorting across capacitor 5. The collector of transistor 38 is connected to the positive side of cell 1 through resistor 39, and the emitter of transistor 38 is grounded. Thus, when switch 33 is closed, transistor 38 is rendered conductive and the collector of transistor 38 is brought approximately to ground potential. The collector of transistor 38 is connected to the base of transistor 40. The collector of transistor 40 is connected to the common junction point between capacitor 5 and resistor 6, while the emitter of transistor 40 is grounded. Thus, when switch 33 is closed, transistor 35 will be turned on and capacitor 5 will be shorted; transistor 38 will be turned on so that transistor 40 will be turned off; and since transistor 40 is turned off, stage 4 will be placed in series with resistor 6 and the voltage at point A will reflect the ambient light intensity at the scene to be photographed.

Point A is connected to the non-inverting input of operational amplifier 43. The inverting input of operational amplifier 43 is connected to the midpoint of a voltage divider formed by resistors 44 and 45 which are placed in series with each other across cells 1 and 2, providing a reference voltage in exactly the same fashion as resistors 9 and 10, although such reference voltage is derived across both cells 1 and 2 rather than across cell 1 alone. The output of operational amplifier 43 is connected to the cathode of a zener diode 46, which is reverse-biased and has its anode connected to ground. Moreover, the output of operational amplifier 43 is connected to the base of transistor 47. Transistor 47 is connected in a common-emitter configuration, with resistor 48 connected between the emitter and ground, and with the collector of transistor 47 being connected to the cathode of LED 42.

When the voltage at point A is sufficiently high (indicating a sufficiently low resistance in stage 4 caused by a sufficiently bright ambient scene light level), the output of operational amplifier 43 will go sufficiently positive so as to cause transistor 47 to conduct and thereby to cause LED 42 to conduct current and to light up. Zener diode 46 serves the purpose of preventing fluctuations in the light emitted by LED 42 as a result of changes in ambient scene light level which are insufficient to make an exposure impossible. Thus, it can be seen that resistors 44 and 45, operational amplifier 43 zener diode 46, transistor 47, and resistor 48 form a control circuit 41 for LED 42 so as to indicate when an exposure can be taken.

Switch 33 is normally closed, and when switch 3 is closed, the only portions of the circuit which have operational significance are stage 4, transistor 35, resistor 6, control stage 41, and LED 42. However, switch 33 cooperates with trip latch 61 (or with other intermediate structures not shown) so as to open at the latest by the time when blade 59 begins its movement counter-clockwise about axle 59A. When switch 33 is opened, transistor 38 is turned off, causing a voltage to be developed across resistor 39 and turning transistor 40 on. When transistor 40 is turned on, resistor 36 is shorted so as to allow capacitor 5 to be charged through stage 4 without causing current to flow through resistor 6 and thereby affect the RC time constant of stage 4 and capacitor 5. Moreover, when switch 33 is opened, transistor 35 is turned off so that the relaxation oscillator can begin to produce pulses in accordance with ambient scene light level. These pulses are then counted in peak counter 14, which, after a sufficient number of such pulses, turns on transistor 22 and thereby energizes coil 23, closing blade 59.

Thus, it has been shown that after elapse of an interval of time after operation of the shutter, the shutter can be closed in order to cause a properly-exposed picture to be taken in dependence upon ambient scene light level.

The schematic diagram shown in FIG. 2 is the circuitry contained within stage 4 in FIG. 1. Referring now to FIG. 2, it can be seen that a silicon photodiode 49 is connected to operational amplifier 50 in a manner that the anode is connected to the non-inverting input, while the cathode is connected to the inverting input. Moreover, resistor 51 connects the output of operational amplifier 50 to the inverting input of operational amplifier 50, forming a conventional voltage amplifier. The output of operational amplifier 50 is connected to the inverting input of operational amplifier 53 through resistor 52. The non-inverting input of operational amplifier 53 is connected to ground via diode 55. The output of operational amplifier 53 is connected to the inverting input thereof through a logarithmic diode 54 which is connected to the output at its anode and is connected to the inverting input at its cathode.

Those skilled in the art will readily apprehend that by connecting the logarithmic diode 54 between the inverting input and the output of operational amplifier 53, a driver stage with a logarithmic response curve results. Moreover, it can be seen that the output of operational amplifier 53 is connected to ground via two like resistors 56 and 57 which are placed in series with each other to form a voltage divider between the output of operational amplifier 53 and ground. This voltage divider formed by resistors 56 and 57 can be switched by operation of switch 58, depending upon the position of blade 59 in the shutter. In the event that blade 59 has failed to reach a sufficiently open position so that switch 58 is closed, then the voltage appearing at the output of operational amplifier 53 will be halved at the junction point between resistors 56 and 57. However, switch 58 bridges across resistor 56. In the event that switch 58 is closed, then resistor 56 will be shorted and resistor 57 will carry the full output voltage of operational amplifier 53. This closure of switch 58 and shorting of switch 56 takes place after blade 59 has finished its first stage of opening and reached its second stage of opening in which f-stop does not change.

Resistor 64 is connected at one end to the common junction point of resistors 56 and 57. The other end of resistor 64 is connected to the anode of another logarithmic diode 65. The cathode of diode 65 is connected to the inverting input of operational amplifier 66, while the non-inverting input of operational amplifier 66 is connected to ground through diode 68. Finally, resistor 67 bridges across the inverting input and the output of operational amplifier 66. Those skilled in the art will understand that diode 65, operational amplifier 66, and resistor 67 form a driven stage, driven by the previous driver stage and having an anti-logarithmic response curve.

The output of operational amplifier 66 is connected to the inverting input of operational amplifier 70 through resistor 69. The non-inverting input of operational amplifier 70 is connected to ground. The output of operational amplifier 70 is connected to the base of transistor 72 through resistor 71, and the collector of transistor 72 is connected to the inverting input of operational amplifier 70. Thus, a regulated current source is formed by operational amplifier 70, resistor 71, and transistor 72. Since the emitter of transistor 72 is connected to a plate of capacitor 5, the circuitry shown in FIG. 2 acts as a variable resistance, which resistance varies as a function of the voltage developed across photo diode 49 in response to ambient scene light level.

When trip latch 61 is undepressed, the circuitry shown in FIG. 2 charges capacitor 5 using a weighting voltage derived from the midpoint of the switchable voltage divider formed by resistors 56 and 57. Since these two resistors are of equal value, only half the output voltage at the output at the output of operational amplifier 53 is used as a basis for measuring light intensity. When trip lever 61 is depressed, this halved weighting voltage continues to drive the rest of the circuitry until such time as blade 59 moves to completely uncover aperture 63, at which time switch 58 is closed and the full voltage at the output of operational amplifier 53 is available to drive the driven stage. Thus, while blade 59 is moving between its closed position and its maximally-open position, ambient light is weighted at only one-half the value at which it is weighted after blade 59 has fully uncovered aperture 63.

In another embodiment of this invention, switch 58 need not be mechanical. In an alternative embodiment which is at least as useful, switch 58 may be replaced by an electronic switch which operates mechanically independently of blade 59. Inasmuch as the opening time of blade 59 is known (at least within suitable manufacturing tolerances) switch 58 may merely be an electronic switch which closes after a predetermined time delay after trip lever 61 is depressed. This can be accomplished, for example, by placing a semi-conductor across resistor 56 and turning the semiconductor on after elapse of the expected time during which blade 59 will have finished its first stage of opening. After coil 23 has been energized, and blade 59 returned to its original position, such additional semiconductor may be turned off. This alternative embodiment has the advantage that the mechanical switch 58, as shown, is subject to malfunction by virtue of corrosion and contamination by dust and other foreign substances, while in the alternative embodiment just described, no such disadvantages accrue.

It will be understood that each of the elements described above, or two or more together, may also find a useful application in other types of electronic control system for use with shutters in still camera and the like differing from the types described above.

While the invention has been illustrated and described as embodied in an electronic control system for use with shutters in still camera and the like, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An improved photographic camera of the type having a light-totalizing circuit, including photosensitive means exposed to scene light, operative for generating an exposure signal indicating the amount of exposure of film, exposure terminating means operative for generating a terminating signal when the exposure signal has reached a predetermined value corresponding to a correct amount of exposure, and a shutter mechanism which when activated increases the exposure-aperture size gradually from a minimum value to a maximum value,
   whereby for scene light levels above a predetermined level the exposure is terminated before the maximum aperture size can be reached, the final aperture size being relatively large for relatively low scene light levels and relatively small for relatively high scene light levels,
   whereas for scene light levels below the predetermined level the exposure is terminated only after the maximum aperture size has been reached,
   the improvement wherein:
   the photosensitive means includes only a single photosensitive element,
   controllable weighting circuit means receiving a signal from the photosensitive element and applying thereto a variable weighting factor, and
   control means operative during the ongoing course of an exposure for controlling the controllable weighting circuit means so as to change the variable weighting factor during the ongoing course of the exposure in a manner which compensates for the progressive increase in the instantaneous amount of light entering the exposure aperture during said gradual increase of the exposure-aperture size.

2. A camera as defined in claim 1,
   wherein said controllable weighting circuit means comprises a logarithmic amplifier receiving the signal from the photosensitive element and producing a logarithmized signal therefrom, and variable resistance means receiving the logarithmized signal and applying thereto a variable weighting factor determined by the variable resistance of the variable resistance means, thereby producing a weighted logarithmized signal,
   said control means comprising means for changing the resistance of the variable resistance means during the course of the exposure.

3. A camera as defined in claim 2, said means for changing the resistance of the variable resistance means comprising means automatically operative for changing the resistance of the variable resistance means when the exposure-aperture size has reached said maximum value thereof.

4. A camera as defined in claim 3, said means automatically operative for changing the resistance of the variable resistance means when the exposure-aperture size has reached said maximum value thereof comprising means responsive to the exposure-aperture size reaching said maximum value thereof.

5. A camera as defined in claim 4, said variable resistance means comprising plural resistors and connected thereto a switch having switch settings establishing two difference resistance values for said variable resistance means, said means for changing the resistance of the variable resistance means comprising means for changing the setting of the switch when the exposure-aperture size has reached said maximum value thereof.

6. A camera as defined in claim 2, said controllable weighting circuit means furthermore including an antilogarithmic circuit receiving the weighted logarithmized signal and delogarithmizing the latter.

7. A camera as defined in claim 3, said controllable weighting circuit means furthermore including an antilogarithmic circuit receiving the weighted logarithmized signal and delogarithmizing the latter.

8. A camera as defined in claim 5, said controllable weighting circuit means furthermore including an antilogarithmic circuit receiving the weighted logarithmized signal and delogarithmizing the latter.

9. A camera as defined in claim 4, said means responsive to the exposure-aperture size reaching said maximum value thereof including means mechanically coupled to a portion of the shutter mechanism.

10. A camera as defined in claim 3, said means automatically operative for changing the resistance of the variable resistance means when the exposure-aperture size has reached said maximum value thereof comprising timing means operative for changing the resistance of the variable resistance means solely as a function of elapsed time.

* * * * *